Patented Feb. 12, 1946

2,394,829

UNITED STATES PATENT OFFICE 2,394,829

ALLYL-TYPE PHOSPHATES AND THEIR PREPARATION

Lynwood N. Whitehill and Robert S. Barker, Berkeley, Calif., assignors to Shell Development Company, San Francisco, Calif., a corporation of Delaware No Drawing. Application April 26, 1944, Serial No. 532,890

9 Claims. (Cl. 260—461)

This invention relates to a process for the production of esters of phosphoric acid wherein at least one of the ester groups contains at least three carbon atoms of aliphatic character and an olefinic linkage between two such carbon atoms, one of which is linked directly to a saturated carbon atom which is linked directly to an oxygen atom which is linked directly to the phosphorus atom. The invention also relates to novel unsaturated esters of phosphoric acid.

More particularly, the invention provides a method for the production of an allyl-type phosphate which comprises reacting a phosphoric acid halide such as phosphorus oxyhalide or a phosphoric acid ester halide with an allyl-type alcohol (i. e. an alcohol containing an olefinic linkage between two carbon atoms of aliphatic character one of which is linked directly by a single bond to the carbinol carbon atom) at a temperature below about −25° C. In one of the most specific embodiments of the invention, triallyl phosphate may be prepared by reacting allyl alcohol with phosphorus oxychloride at a temperature below about −25° C.

Attempts to form allyl-type phosphates according to reactions employed for the formation of alkyl and/or aryl phosphates, e. g. by reacting an allyl-type alcohol with a phosphorus oxyhalide or a phosphoric acid halide under ordinary temperatures, have been unsuccessful due to the excessive formation of by-products such as the allyl-type chlorides, which are known to form with exceptional ease by reaction of the alcohol with the hydrochloric acid formed.

It has been found that these allyl-type phosphates may be formed by carrying out the reaction at a temperature considerably below that ordinarily used in the preparation of the saturated phosphate esters. Temperatures below about −25° C. are advantageous, and in most cases temperatures between about −25° C. and about −70° C. have proved convenient and effective, although lower temperatures may be used if desired. When an allyl-type phosphate such as triallyl phosphate is prepared according to the process of this invention, temperatures of from about −30° C. to about −40° C. have been found to produce efficient yields.

Allyl-type alcohols which may be reacted with a phosphorus oxyhalide or a phosphoric acid ester halide according to the process of the invention may be represented by the formula

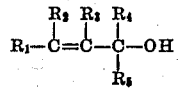

wherein $R_1$, $R_2$, $R_3$, $R_4$ and $R_5$ represent members of the group consisting of the hydrogen atom, the hydrocarbon radicals and substituted hydrocarbon radicals. Representative of the hydrocarbon and substituted hydrocarbon radicals which $R_1$, $R_2$, $R_3$, $R_4$ and $R_5$ may represent are the alkyl, alkenyl, aryl, cycloalkyl, cyclo-alkenyl, aralkyl, aralkenyl, heterocyclic radicals and their halo-, nitro-, amino-, sulfur- and the like substituted radicals and their homologues, such as, for example, methyl, ethyl, propyl, isopropyl, butyl, isobutyl, tertiary butyl, amyl, hexyl, cyclohexyl, cyclohexenyl, vinyl, allyl, butenyl, hexadienyl, benzyl, phenyl, furyl, thiophenyl, isophoryl, dihydroisophoryl, chloromethyl, nitrobenzyl, chlorbutyl, sulfolanyl, sulfolenyl, etc. In the above formula, $R_1$, $R_2$, $R_3$, $R_4$ and $R_5$ are preferably selected from the group consisting of the hydrogen atom and the hydrocarbon radicals of saturated character, i. e., the alkyl, aryl, aralkyl and cycloalkyl radicals and their homologues. It is to be understood that any of $R_1$, $R_2$, $R_3$, $R_4$, and $R_5$ may be linked together to form a cycle, e. g. $R_2$ and $R_3$ may be linked together to form a cyclic radical such as the furfuryl radical. Representative examples of allyl-type alcohols which may be reacted are allyl alcohol, methallyl alcohol, methyl vinyl carbinol, tiglyl alcohol, crotyl alcohol, ethallyl alcohol, cinnamyl alcohol, furfuryl alcohol, and the like and their homologues and suitable substitution products.

The phosphoric acid halide with which the allyl-type alcohol is to be reacted according to the process of the invention is represented by the formula

wherein Z is a halogen atom and X and Y may be the same or different and are selected from the group comprising the halogen atoms and the OR group, R representing a hydrocarbon radical which may be cyclic or acyclic, saturated or unsaturated. That is, the phosphoric acid halide may be a phosphorus oxyhalide or a phosphoric acid ester halide, i. e. a phosphoric acid ester containing at least one halogen atom attached to the phosphorus atom. Suitable phosphorus oxyhalides include phosphorus oxychloride, phosphorus oxyfluoride, etc., as well as the mixed phosphorus oxyhalides such as phosphorus oxydichloridemonobromide, phosphorus oxy-dibromidemonochloride, etc. By proper control of the molar amounts of allyl-type alcohol in relation to the molar amounts of phosphorus oxyhalide, the number of halogen atoms replaced by allyl-type ester groups may be controlled: for example, by reacting equimolar amounts of allyl alcohol and phosphorus oxy-chloride, allyl phosphoric acid dichloride may be produced; while reacting phosphorus oxychloride with a substantial molar excess of allyl alcohol will result in the production of diallyl phosphoric acid monochloride and/or triallyl phosphate. A mixture of an allyl-type alcohol with any other alcohol such as an alkyl carbinol, a phenol, or any other unsaturated alcohol when reacted with a phosphorus oxyhalide will produce the corresponding mixed esters, i. e. a mixture of crotyl alcohol and ethanol reacted with phosphorus oxychloride will produce ethyl dicrotyl phosphate and/or crotyl diethyl phosphate. If a phosphorus oxyhalide is reacted with a mixture of allyl-type alcohols, a mixed tri(allyl-type) ester of phosphoric acid may be produced, e. g. a mixture of allyl alcohol and methallyl alcohol reacted with phosphorus oxychloride would produce methallyl diallyl phosphate and/or allyl dimethallyl phosphate, depending upon the proportions of the alcohols in the reactant mixture.

If an allyl-type alcohol is reacted with a phosphoric acid ester halide according to the process of the invention, a di- and/or tri-hydrocarbyl phosphate will be produced according to the molar proportions of the reactants. When an allyl-type alcohol is reacted with a phosphoric acid allyl-type ester dihalide, the resultant product will be a phosphoric di(allyl-type) ester monohalide, or, if the alcohol is in substantial molar excess, a tri(allyl-type) phosphate will be produced. For example, allyl alcohol reacted with allyl phosphoric acid dichloride will produce diallyl phosphoric acid monochloride and/or triallyl phosphate; methallyl alcohol reacted with allyl phosphoric acid difluoride will produce methallyl allyl phosphoric acid monofluoride and/or allyl dimethallyl phosphate; crotyl alcohol reacted with methallyl phosphoric acid dichloride will yield crotyl methallyl phosphoric acid monochloride and/or dicrotyl methallyl phosphate; etc. If a mixture of an allyl-type alcohol and any other alcohol is reacted with a phosphoric acid ester dihalide, the product will contain the corresponding mixed ester, e. g. crotyl alcohol and ethanol when reacted with methallyl phosphoric acid dibromide will form ethyl methallyl crotyl phosphate. A mixture of allyl-type alcohols reacted with a phosphoric allyl-type ester dihalide may produce a mixed tri(allyl-type) phosphate, e. g. allyl alcohol and methallyl alcohol reacted with allyl phosphoric acid dichloride will produce methallyl diallyl phosphate. An allyl-type alcohol reacted with a phosphoric acid ester monohalide forms the corresponding phosphoric acid tri-ester.

The allyl-type phosphoric acid ester compounds which may be prepared by execution of the process of the invention have the general formula

wherein X and Y may be the same or different and represent members of the group comprising the halogen atoms and the OR group, R representing a hydrocarbon radical which may be cyclic or acyclic, saturated or unsaturated. One group of compounds which it is particularly convenient to prepare according to the process of the invention is that group which comprises the tri(allyl-type) esters of phosphoric acid (i. e. when X and Y are the same OR group, R representing the allyl-type radical, $$-\underset{R_5}{\overset{R_4}{C}}-\overset{R_3}{C}=\overset{R_2}{C}-R_1)$$

and more particularly triallyl phosphate.

The allyl-type alcohol and the phosphoric acid halide compound may be reacted in any proportions, although it is generally preferred to have a molar amount of alcohol at least equal to about the molar amount of the phosphoric acid halide. Depending upon the reactants and upon the products desired, for every mole of phosphoric oxyhalide or phosphoric acid ester halide present, one, two or three moles of allyl-type alcohol may be reacted, although any other proportion may be employed.

The reaction preferably takes place in the presence of a suitable inorganic or organic base, such as an organic amine, which may react with some of the hydrogen halide as it is formed, but is otherwise inert to the reactants and/or products under the reaction conditions. An inorganic base such as potassium carbonate, sodium carbonate, potassium hydroxide, sodium hydroxide, ammonia, etc., may be used; but in many cases it has been found convenient to use an organic base such as an organic amine. Suitable organic amines include pyridine, aniline, toluidine, dimethylaniline, etc. Upon completion of the reaction, it is advisable to filter off the reaction product of the amine and the hydrogen halide, e. g. pyridinium hydrochloride, as soon as possible in order to avoid any unnecessary length of contact time between it and the allyl-type phosphate. The organic amine is preferably present in an approximately equimolar amount with the allyl-type alcohol being reacted, although any other suitable amount may be used.

The reaction may take place in the presence or absence of a solvent which must be inert to the reactants and/or products under the conditions of the reaction. Suitable solvents are toluene, acetone, ethers such as diethyl ether, aliphatic hydrocarbons, etc. The solvent should be prevent in an amount sufficient at least to bring about solution of portions of the reactants, but not enough to cause excessive dilution of the reactants or in any other way to interfere with the process of the invention.

When distilling the final product obtained from the reaction, it may prove desirable to use an inhibitor such as tannic acid, naphthol, phenols, quinols or copper salts, etc. For example, in distilling the final product containing triallyl phosphate prepared by reacting allyl alcohol with phosphoric oxychloride, it has been found expedient to use such an inhibitor to help prevent a mild explosion due apparently to the uncontrolled polymerization of the triallyl phosphate. It is also desirable to avoid overheating of the distillation flask.

The following examples serve to illustrate the execution of the process of the invention to those skilled in the art.

Example I

Approximately 690 parts by weight of dry allyl alcohol were charged into a reactor with about 690 parts by weight of toluene and about 815 parts by weight of pyridine. After cooling this solution to about $-30°$ C., approximately 510 parts by weight of phosphorus oxychloride in about 430 parts by weight of toluene were added slowly with stirring over a period of about three hours. The temperature was allowed to rise to about $0°$ C. for about one and one-half hours and the reaction mixture was filtered. The filtrate was washed, dried over sodium sulfate and the toluene removed. About 630 parts by weight of crude material were obtained, corresponding to about an 87% conversion. To this product was added about one part by weight of tannic acid and distillation was effected from a Claisen flask to obtain about 550 parts by weight of distillate boiling at $80°$ C. to $90°$ C. at 1.5 mm. From this fraction, triallyl phosphate boiling at $80°$ C. at 0.5 mm., was recovered. The operation resulted in a good yield of triallyl phosphate.

Example II

Following the procedure described in Example I, about 230 parts by weight of allyl alcohol were reacted with about 170 parts by weight of phosphorus oxychloride in the presence of about 270 parts by weight of pyridine at about $-35°$ C. using toluene as a solvent. A conversion of about 88% was obtained, and a good yield of triallyl phosphate was recovered.

Example III

In accordance with the procedure described in Example I, about 230 parts by weight of allyl alcohol are reacted with about 510 parts by weight of phosphorus oxychloride in the presence of about 270 parts by weight of pyridine at a temperature of about $-30°$ C. to about $-40°$ C. to produce phosphoric acid monoallyl ester dichloride.

Example IV

Tricrotyl phosphate is prepared by reacting about 860 parts by weight of crotyl alcohol with about 510 parts by weight of phosphorus oxychloride in the presence of about 815 parts by weight of pyridine at about $-40°$ C. following the procedure described in Example I.

Numerous other allyl-type phosphates may be prepared according to the procedure described in the examples. These allyl-type phosphates serve a variety of useful purposes as solvents, as modifying agents in polymerization procedures, as intermediates in organic syntheses, as plasticizers, as compounds to be used in the preparation of polymers, copolymers, and synthetic resins, etc.

We claim as our invention:

1. A process for the production of triallyl phosphate which comprises reacting phosphorus oxychloride with a substantial molar excess of allyl alcohol in solution in toluene, at a temperature between about $-30°$ C. and about $-40°$ C. in the presence of pyridine.

2. A process for the production of triallyl phosphate which comprises reacting phosphorus oxychloride with a substantial molar excess of allyl alcohol at a temperature below about $-25°$ C. in the presence of pyridine.

3. A process for the production of tricrotyl phosphate which comprises reacting phosphorus oxychloride with a substantial molar excess of crotyl alcohol at a temperature below about $-25°$ C. in the presence of pyridine.

4. A process for the production of allyl phosphoric acid dichloride which comprises reacting approximately equimolar amounts of phosphorus oxychloride and allyl alcohol at a temperature below about $-25°$ C. in the presence of pyridine.

5. A process which comprises reacting crotyl alcohol with phosphorus oxychloride at a temperature below about $-25°$ C. in the presence of pyridine.

6. A process for the production of a phosphoric acid ester of allyl alcohol which comprises reacting phosphorus oxychloride with allyl alcohol at a temperature below about $-25°$ C. in the presence of pyridine.

7. A process for the production of a phosphoric acid ester which comprises reacting a phosphorus oxyhalide with an alcohol containing an olefinic linkage between two carbon atoms of aliphatic character one of which is linked directly by a single bond to the carbinol carbon atom, at a temperature below about $-25°$ C. in the presence of an organic amine.

8. A process for the production of a phosphoric acid ester which comprises reacting a member of the group consisting of the phosphorus oxyhalides and the esters of phosphoric acid wherein at least one halogen atom is linked directly to the phosphorus atom with an alcohol containing an olefinic linkage between two carbon atoms of aliphatic character one of which is linked directly by a single bond to the carbinol carbon atom, at a temperature below about $-25°$ C. in the presence of a base.

9. A process for the production of an unsaturated phosphoric acid ester, which comprises reacting a member of the group consisting of the phosphorus oxyhalides and the esters of phosphoric acid wherein at least one halogen atom is linked directly to the phosphorus atom with an alcohol containing an olefinic linkage between two carbon atoms of aliphatic character one of which is linked directly by a single bond to the carbinol carbon atom, at a temperature below about $-25°$ C.

LYNWOOD N. WHITEHILL.
ROBERT S. BARKER.